Dec. 9, 1958 G. A. BILOCQ 2,863,551
ALIGNING CONVEYOR SYSTEM
Filed March 21, 1957 2 Sheets-Sheet 1
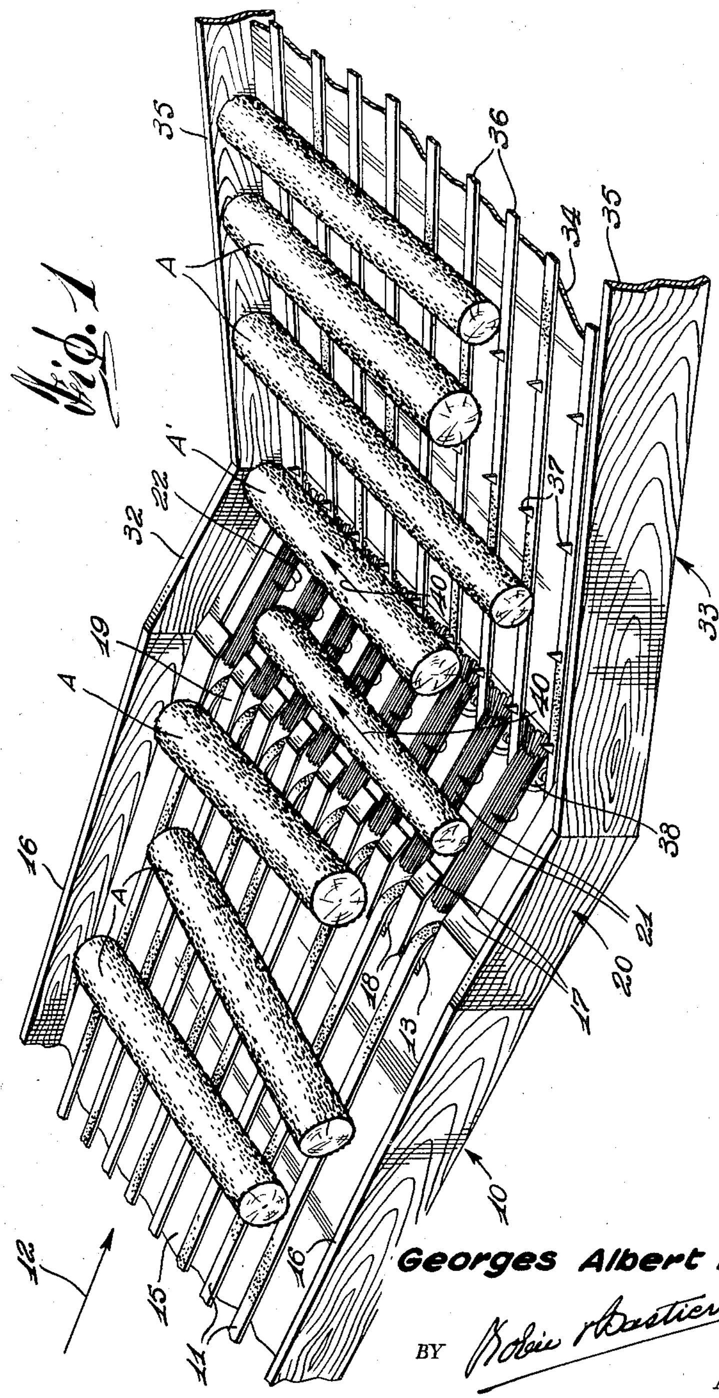
INVENTOR
Georges Albert BILOCQ
BY Robic Bastien
ATTORNEYS Dec. 9, 1958 G. A. BILOCQ 2,863,551
ALIGNING CONVEYOR SYSTEM
Filed March 21, 1957 2 Sheets-Sheet 2
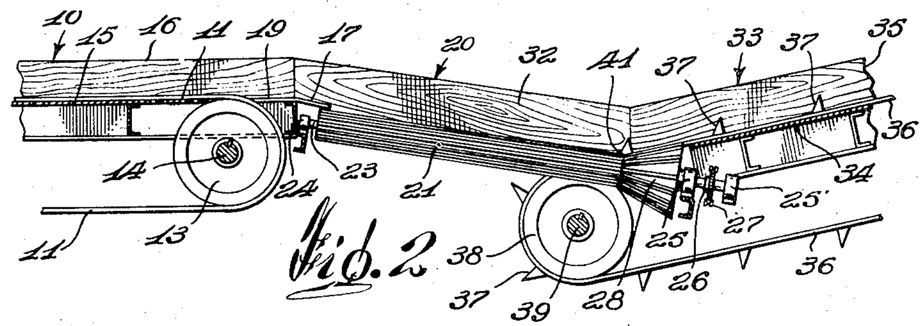
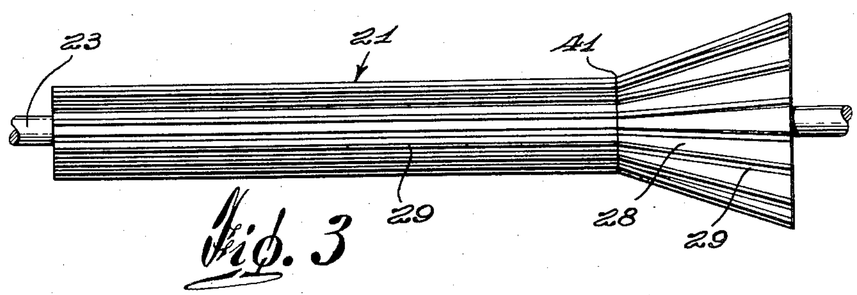
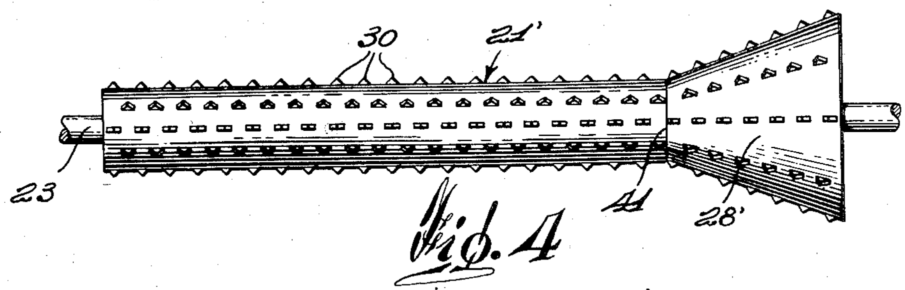
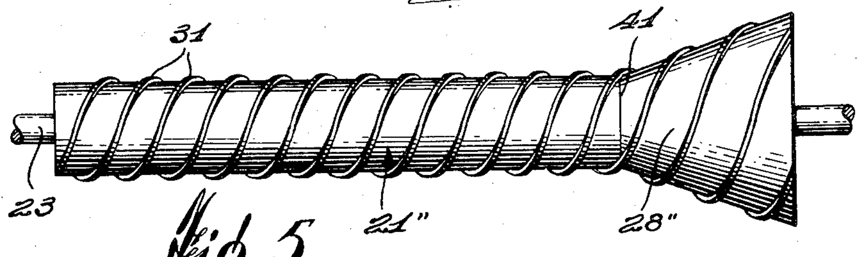
INVENTOR
Georges Albert BILOCQ
BY Robic & Bastien
ATTORNEYS 2,863,551

ALIGNING CONVEYOR SYSTEM

Georges Albert Bilocq, Plessisville, Quebec, Canada, assignor to Forano Limitee, Plessisville, Quebec, Canada Application March 21, 1957, Serial No. 647,580

14 Claims. (Cl. 198—29)

The present invention relates to a conveyor system and, more particularly, to an aligning section for a conveyor system that is particularly adapted to align the ends of elongated articles of various lengths in a common transverse plane; said elongated articles being preferably wood logs which are advancing successively along an infeed conveyor and disposed at random on said conveyor. The logs thus aligned are subsequently more readily handled and are properly disposed for certain subsequent operations such as sawing off equal lengths and/or stamping the ends for identification purposes.

The aligning conveyor section, according to the present invention, is, moreover, adapted to align the elongated articles such that they will extend substantially parallel to each other as opposed to the random disposition of their longitudinal axes on the infeed conveyor.

The general object of the present invention is the provision of an aligning conveyor section in which articles of different or of the same length disposed at random on an infeed conveyor are caused, when acted upon by said aligning conveyor section, to take successive positions substantially parallel to each other and simultaneously to take a position with one end of said elongated articles aligned in a common plane substantially perpendicular to the longitudinal axes of said elongated articles.

Another important object of the present invention is the provision of an aligning conveyor section of the character described which is relatively simple and inexpensive to manufacture and which is efficient in service.

Another important object of the present invention is the provision of an aligning conveyor section of the character described which has a high log handling capacity such that it may be used in the pulpwood and in the lumber industries.

The foregoing and other important objects of the present invention will become more apparent during the following disclosure and by referring to the drawings in which:

Figure 1 is a perspective view of the aligning conveyor system according to the present invention;

Figure 2 is a partial side view of the same; and

Figures 3, 4 and 5 are elevations of three different embodiments of the aligning rollers.

Referring now more particularly to the drawings in which like reference characters indicate like elements throughout, reference numeral 10 generally indicates an infeed conveyor of any conventional construction. In the embodiment illustrated, said conveyor comprises a plurality of parallel belts 11, the active or top runs of which move in a longitudinal direction according to arrow 12. The belts 12 are trained at both ends on pulleys 13 which are mounted on a common shaft 14 which extends transversely of the infeed conveyor 10. One of the shafts 14 is driven by suitable driving means such as an electric motor (not shown). The infeed conveyor is provided with an apron 15 and short side walls 16. The discharge end of the apron 15 is bevelled, as shown at 17, and is provided with spaced deep notches 18, thereby forming outwardly extending fingers 19. The wheels 13 engage the notches 18 to receive the belts 11.

The infeed conveyor, although shown as composed of a plurality of parallel belts 11, can be made in any other conventional manner and can comprise, for instance, a single wide conveyor belt or a plurality of endless chains, or the like.

The infeed conveyor 10 discharges into an aligning conveyor section, generally indicated at 20. This section is preferably composed of a plurality of spaced parallel rollers 21 having their longitudinal axes disposed in substantial alignment with the direction of movement of the belts 11 of the infeed conveyor 10 and having their upper ends engaging the notches 18 between the fingers 19. The log contacting surface areas of said rollers 21 are disposed in a substantially common plane which is forwardly and downwardly inclined with respect to the longitudinal direction of travel of the infeed conveyor 10, as clearly shown in Figure 2. The rollers 21 are adapted to rotate about their longitudinal axes in a common direction of rotation as indicated by the arrows 22. Each roller 21 has a shaft 23 having one end journalled in a bearing 24 and its other end journalled in spaced bearings 25—25' between which is disposed a sprocket wheel 26 secured to the shaft 23. The several wheels 26 are driven by a common endless sprocket chain 27 and the shaft of one of the rollers 21 is directly connected to suitable driving means such as an electric motor, not shown.

The rollers 21 are cylindrical in shape over the major part of their length and are provided at their lower discharge end with an enlargement 28 in the form of a frusto conical portion having its smaller base merging with the cylindrical portion of the roller. In order to provide positive driving of the elongated articles engaged by the aligning rollers 21, the latter are provided at their outer surface with suitable frictional elements, such as shown in Figures 3 to 5 inclusive. According to the embodiment of Figure 3, said frictional means consists in a plurality of longitudinally extending ribs 29 which are disposed at the outer surface of the cylindrical and frusto-conical portions of the roller.

According to the second embodiment shown in Figure 4, said frictional means comprises a plurality of spikes 30 of triangular shape and disposed longitudinally of the roller 21' and of its enlargement 28'.

According to a third embodiment shown in Figure 5, the roller 21'', including its enlargement 28'', is provided with a helically extending rib 31.

The aligning conveyor section 20 is provided with side walls or skirt boards 32 which are continuations of the side walls 16 of the infeed conveyor 10.

The aligning conveyor section 20 is followed in the direction of movement of the belts 11 by an outgoing conveyor section 33 of any conventional construction, but which is preferably upwardly inclined in the outgoing direction of the elongated articles moving thereover.

Said outgoing conveyor section 33 preferably comprises a stationary apron 34 provided with side walls 35 which are continuations of the skirt boards 32 of the aligning conveyor section 20. A plurality of longitudinally extending spaced parallel endless belts 36, provided with transversely aligned spikes 37, have their upper run moving over the apron 34, said belts 36 being trained over end wheels, the lower wheels being shown at 38 in Figure 2. Said lower wheels 38 are secured to a common shaft 39 transversely disposed underneath the lower end of the aligning conveyor section, such that the belts 36 overlap the frusto-conical portions of the aligning rollers 21. The belts 36 are positively driven by suitable driving means such as an electric motor (not shown) operatively connected to the shaft 39.

The arrangement according to the present invention operates as follows:

Elongated articles, such as logs A, of different lengths are fed at random onto the infeed conveyor 10 such that their longitudinal axes are disposed in any angular direction with respect to the direction of movement of the conveyor 10. The infeed conveyor 10 discharges the logs A successively onto the rollers 21 which give them two main movements. Due to the downward inclination of the rollers 21, the logs move under gravity over the same until they reach the transversely aligned nicks 41 of the rollers, formed by the junction of the cylindrical portion with the frusto-conical portion of said rollers 21. During this first movement, the logs A are automatically disposed in a position with their longitudinal axis substantially perpendicular to the longitudinal axes of the rollers 21. Simultaneously, due to the common rotational movement of the rollers 21, the logs are moved transversely of the longitudinal direction of the whole conveyor unit, as indicated by arrow 40, until their ends abut a skirt board 32, whereby the final position of the logs A is indicated by the log A′ in Figure 1. The log A is then carried by the outgoing conveyor section 33, by means of the belts 36 and log engaging spikes 37, to be discharged at any suitable location where the logs will be sawn to obtain logs of equal length, or their aligned ends will be stamped with a suitable identifying mark.

When moving along the outgoing conveyor section 33, the logs A all have one end abutting against a common side wall 35, and these ends are all disposed in a common plane which is perpendicular to the longitudinal axes of the parallel logs.

The length of the aligning rollers 21, their speed of rotation and their downward inclination relative to the longitudinal spacing and speed of the spikes 37 on the upwardly inclined conveyor section 33 is such that each successive log is moved transversely of the conveyor section 20 quickly enough so that it is in a position shown at A′ before being engaged by spikes 37 of the belts 36.

As each moving part of the system, according to the present invention, has a continuous uniform movement, the device, according to the present invention, may be operated at a fast speed to obtain a great log handling capacity.

It will be noted that the inclination of the log engaging part of the frusto-conical enlargement 28 is substantially the same as the inclination of the belts 36 of the outgoing conveyor section and lies in substantially the same plane as the plane of said outgoing belts 36.

The specific construction of the outgoing conveyor section 33, although illustrated as being composed of several narrow belts, may be made in any other conventional manner, such as a wide belt, or a plurality of endless chains, or the like.

While a preferred embodiment according to the present invention has been illustrated and described it is understood that various modifications may be resorted to without departing from the spirit and scope of the appended claims.

I claim:

1. In a conveyor system for elongated articles, having an infeed portion and an outgoing conveyor; an intermediate aligning section comprising a conveyor driven in a direction transverse to the conveying direction of the outgoing conveyor and having a top surface downwardly inclined towards the outgoing conveyor, first abutting means parallel to the direction of said transverse conveyor and positioned between said transverse conveyor and the outgoing conveyor and adapted to abut said articles lengthwise, second abutting means parallel to the direction of said outgoing conveyor, and adapted to abut said articles endwise, said transverse conveyor cooperating with its inclined top surface to convey an elongated article to a position where the article is lengthwise and endwise abutted by said first and second abutting means, and means on said outgoing conveyor for removing said articles when they have reached said position.

2. In a conveyor system as claimed in claim 1, said first abutting means being formed of a conveyor directed in the same direction as said transverse conveyor, the top surface of said conveyor being downwardly inclined towards said transverse conveyor.

3. In a conveyor system as claimed in claim 1, said transverse conveyor being formed of at least two rollers axially positioned in the direction of the outgoing conveyor and rotatively driven towards said second abutting means, the top tangential plane of said rollers being downwardly inclined towards said outgoing conveyor.

4. In a conveyor system as claimed in claim 1, said first abutting means being formed of at least two rollers axially positioned in the direction of the outgoing conveyor and rotatively directed towards said second abutting means, the top tangential plane of said rollers being downwardly inclined towards said transverse conveyor.

5. In a conveyor system as claimed in claim 1, said transverse conveyor being formed of at least two rollers axially positioned in the direction of the outgoing conveyor and rotatively driven towards said second abutting means, the top tangential plane of said rollers being downwardly inclined towards said outgoing conveyor, said first abutting means being formed of at least two rollers coaxial with said first rollers, the top tangential plane of said second rollers being downwardly inclined towards said top tangential plane of said first rollers.

6. In a conveyor system as claimed in claim 1, said transverse conveyor being formed of at least two cylindrical rollers axially positioned in the direction of the outgoing conveyor and rotatively driven towards said second abutting means, the axial common plane of said rollers being downwardly inclined towards said outgoing conveyor, said first abutting means being formed of at least two frusto-conical rollers coaxial with said first rollers, the top tangential plane of said second rollers being downwardly inclined towards said axial plane of said first rollers.

7. In a conveyor system as claimed in claim 6, each said cylindrical roller being rigidly connected with said frusto-conical roller coaxial therewith.

8. In a conveyor system as claimed in claim 1, said second abutting means being a vertical wall.

9. In a conveyor system as claimed in claim 5, each roller having frictional means adapted to engage said articles for transverse movement thereof.

10. In a conveyor system as claimed in claim 5, each roller having a plurality of longitudinal ribs.

11. In a conveyor system as claimed in claim 5, each roller having a plurality of spikes.

12. In a conveyor system as claimed in claim 5, each roller having at least one helical rib.

13. In a conveyor system as claimed in claim 1, said infeed portion being positioned at the side of said aligning section opposite to the outgoing conveyor.

14. In a conveyor system as claimed in claim 2, said outgoing conveyor being generally coplanar with said top surface of said conveyor constituting said first abutting means.

References Cited in the file of this patent

UNITED STATES PATENTS

| | | |
|---|---|---|
| 653,506 | Edwards | July 10, 1900 |
| 744,874 | Neeland | Nov. 24, 1903 |